Fig. 2.

Patented Jan. 12, 1932

1,840,565

UNITED STATES PATENT OFFICE

ALFRED C. BUENSOD, OF NEW YORK, N. Y., ASSIGNOR, BY MESNE ASSIGNMENTS, TO AUDITORIUM VENTILATING CORPORATION, OF JERSEY CITY, NEW JERSEY, A CORPORATION OF NEW JERSEY

METHOD OF AND APPARATUS FOR CONTROLLING TEMPERATURE AND HUMIDITY

Application filed August 2, 1927. Serial No. 210,092.

This invention relates more particularly to a method of and apparatus for automatically controlling temperature and humidity in enclosures or buildings generally, and especially in theaters, auditoriums, assembly halls, factory rooms and other places where people assemble in varying numbers, and which are supplied with conditioned air from an air conditioning apparatus. The air conditioning apparatus usually comprises an air washer adapted to cleanse the air and either to raise or lower its dew point for humidifying or dehumidifying the air, which may be either fresh, outdoor air, return air from the enclosure, or a suitably proportioned mixture of both. Cooperating with the conditioning apparatus are one or more heaters for heating the air when necessary, and a fan or means for moving the air through the conditioning apparatus and delivering the conditioned air, and also recirculated air to the enclosure or rooms to be conditioned.

Various different conditions throughout a year's operation have to be met to maintain uniform desirable temperatures and relative humidity. At the same time throughout the year's cycle of operation, air movement and ventilation is required, especially in places such as theaters, auditoriums and the like, where large numbers of people congregate.

In winter, heating is required, the amount depending on the outside temperature, the exposure and the construction of the building, and the amount of fresh air introduced for ventilation. It is also desirable to operate the air washer to cleanse the air being introduced and to maintain in the enclosure being conditioned a dew point that is not too low for comfort, thereby regulating the minimum relative humidity maintained in the enclosure.

In summer, instead of heating the air introduced, cooling is necessary to maintain the desired temperature which may be substantially the same as in winter. The outside dew point also is higher in summer than desired in the enclosure being conditioned and, therefore, the dehumidifier should reduce the dew point of the incoming air. The cooling and dehumidifying necessary is dependent on the number of people present in the enclosure and also on other sources of heat, such as lights, radiation from the walls, etc. It is also dependent on the amount of fresh air introduced and the extent of the reduction in total heat of the air introduced.

In between summer and winter there are intermediary conditions in which either slight cooling or heating may be necessary, and the dew point may be either too high or too low, necessitating either lowering or raising same.

Outside conditions, of course, vary from day to day and even from hour to hour, so that with changes of the total work to be done in the enclosure being conditioned, it is almost impossible to regulate the desired conditions by hand effectively and practically. At the same time that either heating, cooling, dehumidifying or humidifying is necessary, a certain amount of fresh air may be necessary for ventilation, and to overcome any infiltration of raw outside air, due to independent exhaust systems or gravitational air columns, due to the difference in weight of air indoors and outdoors. For this reason it is preferable to have a fresh air opening allowing a fixed, minimum quantity of fresh air to enter the air conditioning system.

Air conditioning engineers recognize that there are certain ranges of temperatures and relative humidities that are comfortable, and where there are no materials that are affected by temperature or relative humidity, a greater range of temperature and relative humidity is permissible where comfort alone is to be considered. For instance, people in assemblage are comfortable in summer where the temperature ranges from 70° to 77° with a relative humidity of 60 percent or less. In winter, the temperature should be nearer 70° with a relative humidity of from 30 to 40 percent. Higher temperatures and relative humidities can be as easily maintained and is so done in warmer climates, but in colder climates, some trouble might be experienced from condensation on doors and windows.

For the purpose of illustration, let it be assumed that it is desired to have 71° and 38° dew point in winter and 71° and 50° dew complished by the cooling capacity available. Inasmuch as the total heat of the air of the enclosure has been reduced and is then lower than that of the outside air, by returning sufficient air from the enclosure direct to the dehumidifier, the total work to be done is lessened. Thus, a third thermostat set at a desired maximum temperature for the enclosure operates when this maximum temperature is reached, to cause the return of air from the enclosure to the air conditioner and shut off the fresh air, thus utilizing all of the cooling means available to cool and dehumidify the air passing through the air conditioner. The minimum amount of fresh air for ventilation is still being admitted.

Figure 1:
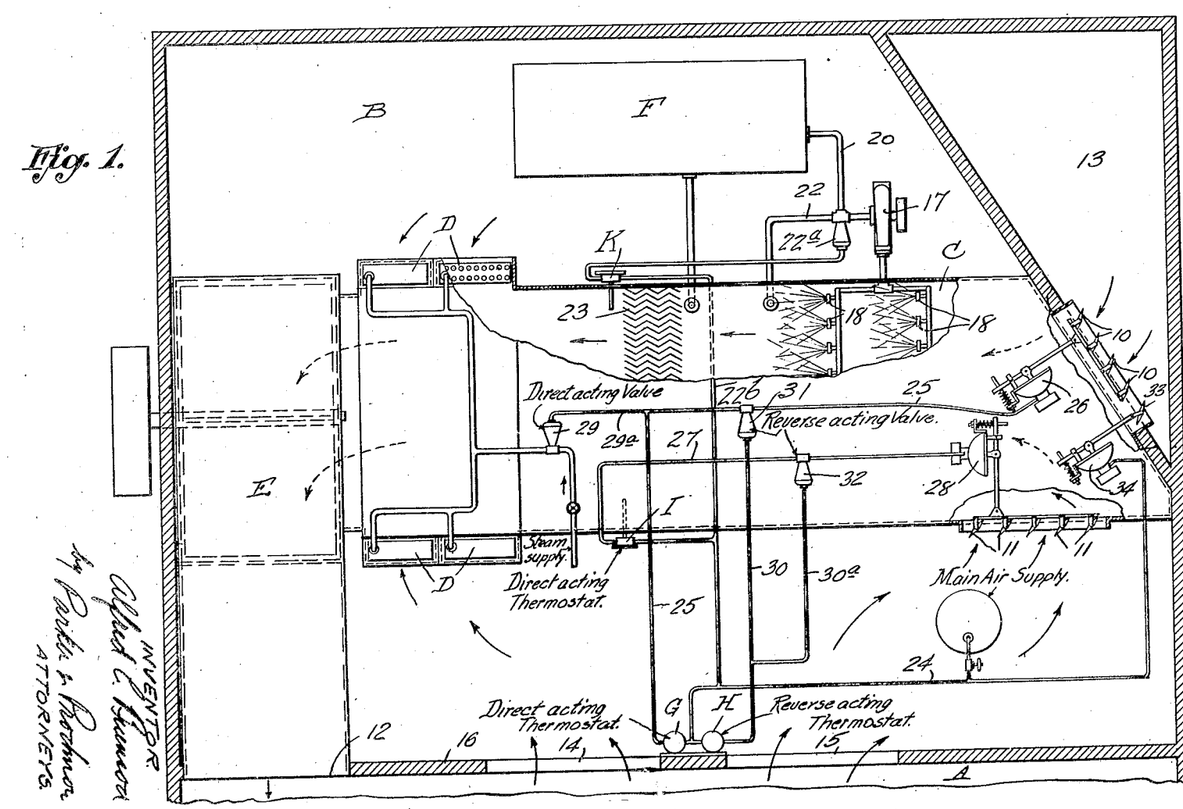
Fig. 1 is a diagrammatic view of an apparatus provided with temperature and humidity control means according to one embodiment of my invention.

Referring first to Fig. 1, A represents the enclosure, room or rooms in which the temperature and humidity conditions are to be regulated. As shown, the air conditioning apparatus is located in a tight chamber B and comprises an air washer C in which spray water is used for cleaning and changing the dew point of the air D D indicate one or more heaters of any suitable kind, such as steam heated tubes spaced apart for the passage of air between them, for heating the air when necessary, and E is a fan which delivers or distributes the conditioned air to the enclosure A or spaces to be conditioned. The casing of the air conditioner C is provided with an opening controlled by a suitable damper 10, preferably of the louvre type, for the admission of outside or fresh air and an opening controlled by dampers 11 for the admission of return air from the enclosure, and the fan E is adapted to draw air through either or both of said openings into the air conditioner and also to bypass or recirculate air from the enclosure A through the heaters D, as shown by the arrows, and deliver the conditioned and recirculated air as through a duct or opening 12 to the enclosure A. In the arrangement shown, the fresh air enters through a chamber or shaft 13 open to the outside air, and the return air from the enclosure is admitted to the apparatus chamber B through openings 14 and 15 in the partition wall 16, but it will be understood that the apparatus and ducts or openings for the entrance and exit of the air may be of any other suitable arrangement, depending upon the construction of the building and the location of the conditioning apparatus relative to the enclosure or spaces to be conditioned. With the heaters arranged as shown, the fan draws a certain proportion of the air through the heaters D and another portion through the air conditioner, but this arrangement of the heaters is not essential to the operation of the control, as a heater or heaters could be placed between the fan E and the dehumidifier or in the fan discharge.

17 indicates the usual pump connected to nozzles 18 for spraying water in the air conditioner casing so that the air will pass through the spray for washing the air, and a water refrigerating apparatus or source of cold water F is provided from which the pump may be supplied so that any desired dew point of the air leaving the air conditioner can be obtained. Water circulating pipes 20, 21 and 22, and a three-way valve 22a are shown, by which the pump can either draw water from the bottom of the casing C through the cooling source F, or draw the water directly from the air conditioner casing C for simply recirculating the spray water when refrigeration of the water is not necessary. The temperature in the air conditioner is automatically controlled to obtain the desired dew point of the conditioned air, as hereinafter explained. The usual eliminators for freeing the air from entrained moisture are represented at 23.

G H and I represent three thermostats or regulating devices of usual or any suitable construction, of which G and I are direct acting and H is reverse acting. These thermostats are preferably of the graduating action type, although the thermostat H could be of the quick acting type. Thermostats G and H are both preferably located in the path of the return air from the enclosure, which has the average temperature of the enclosure A, but they could, of course, be located directly in the enclosure where they would respond to changes in the average temperature therein. The former is actuated by the minimum and the latter by the maximum desired temperature of the enclosure. Thermostat G controls the operation of the fresh air damper 10 and thermostat I, which is located so as to respond to changes in the average dew point temperature of the air leaving the air conditioner, controls the operation of the return air damper 11. For this purpose, the thermostat G may, for example, control the passage of air under pressure from a supply pipe 24, through a pipe 25 to an air motor 26, which is connected to and actuates the fresh air damper 10, and the thermostat I controls the air pressure from the supply through a pipe 27 to an air motor 28 which is connected to and actuates the return air damper 11. Thermostat G also controls the supply of steam to the heater D D by means of a diaphragm valve 29 to which it is connected by an air pressure pipe 29a. As the thermostat G is direct acting, it operates upon an increase in temperature to allow more air to pass and build up pressure in the air motor 26, and increased pressure in this motor opens the connected fresh air damper. The return air damper 11, on the contrary, is closed by an increase of pressure in the actuating motor 28.

The maximum temperature thermostat H is connected as by air pipes 30 and 30a to relay valves 31 and 32 in the pipes 25 and 27. These relay valves are reverse acting, the valves being opened by air pressure on their actuating diaphragms, but when the pressure on the diaphragms is released, any air pressure that may be between the valves and the motors 26 and 28 is relieved through small leak ports controlled by the valves, thereby permitting the motor 26 to close the fresh air damper 10 and the motor 28 to open the return air damper 11. The dew point thermostat I is set to regulate a minimum dew point at say, for example 38°.

Figure 2:
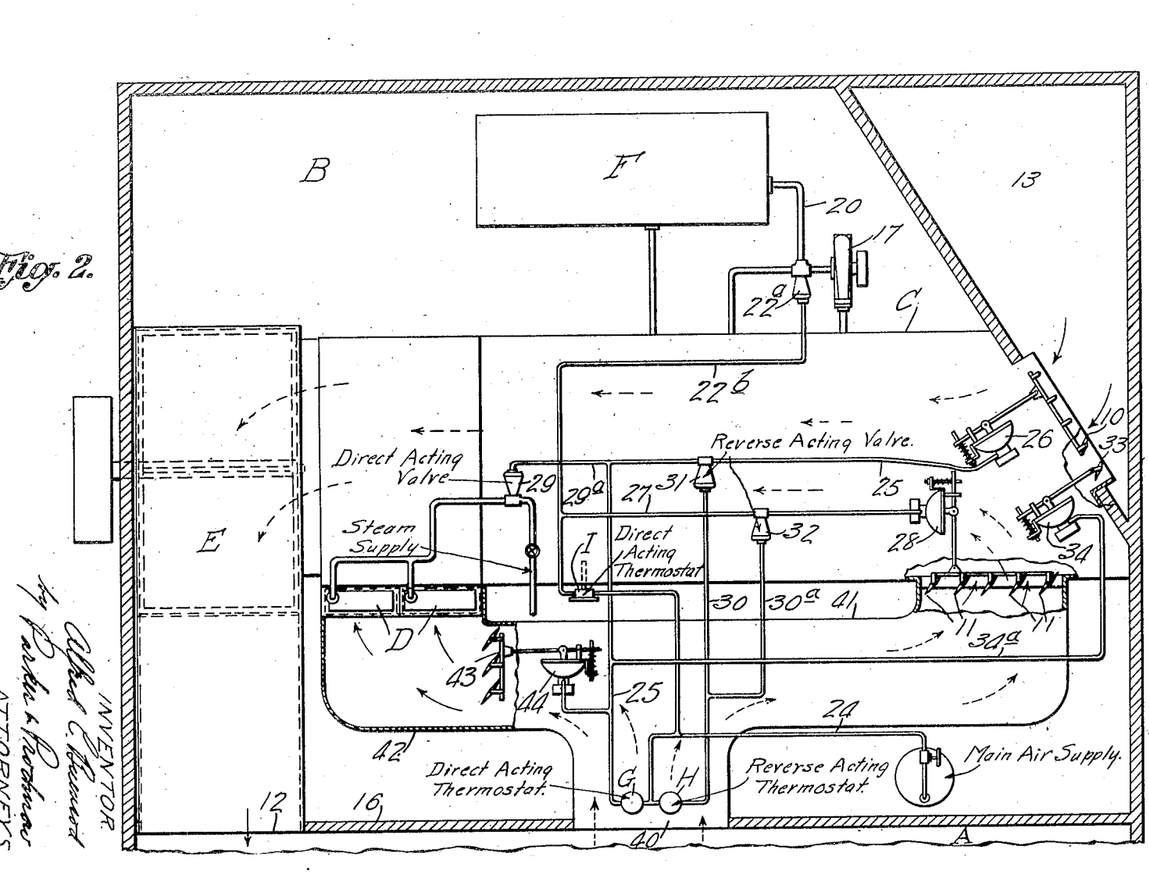
Fig. 2 is a similar view of a slightly modified embodiment of the invention.

The three-way valve 22a for regulating the temperature of the water spray is controlled by a thermostat K influenced by the dew point temperature of the air leaving the air conditioner for maintaining a desired dew point of the air. This thermostat will regulate the reduction in dew point by means of the use of the cold water in the spray water to the temperature at which said thermostat K is set, and quite obviously, if the dew point goes lower than this point, the cold water will be shut off by the three-way valve and a source of heat will be necessary in the air conditioner to raise the dew point to the maximum desired. This source of heat is obtained by the action of the thermostat I in returning air from the enclosure to the air conditioner, as before explained, and if the minimum dew point temperature maintained by I is the same as the dew point temperature maintained by K, the latter thermostat could be dispensed with and the three-way valve 22a controlled by the thermostat I by providing an air pipe 22b connecting the pipe 27 with the motor of the three-way valve 22a, as shown in Fig. 2. In other words, if a constant dew point is desired both winter and summer, only one dew point thermostat, i. e. thermostat I, is necessary, controlling both the return air damper 11 and the three-way valve 22a.

While air under pressure is preferred as the medium through which the thermostats actuate the devices they control, any other known or suitable means could be employed for effecting control by the thermostats.

A minimum quantity of fresh air required for ventilation is admitted at all times during the operation of the system, as for example, by means of an auxiliary fresh air damper 33 which is arranged to control a portion of the fresh air admission opening of the air conditioner, and is actuated independently of the damper 10 by an air motor 34. When the air pressure for operating the several control devices is turned on, it passes to the motor 34 and opens wide the damper 33. The proportions of the openings controlled by this damper and the damper 10 are determined by the requirements of the enclosure being regulated and the amount of fresh air desired or necessary. Manifestly, the damper 33 could be eliminated and the fresh air damper 10 constructed so as not to close beyond a certain point, and thus always admit the required minimum quantity of air. However, it is preferable to have the damper 33 controlled by its independent motor, so that it will shut automatically when the air pressure is released. This is an advantage from an operating standpoint in winter, as in most cases the apparatus would be shut down at night and the fresh air damper should be shut to prevent freezing of the air washer or dehumidifier and to prevent cold air from entering the building.

Another method of operating the minimum fresh air damper 33 to effect this same result and with a distinct additional advantage is to connect air motor 34 with a branch pipe 34a, see Fig. 2, extending from pipe 25 between thermostat G and valve 31, and setting air motor 34 so that it starts opening at a pressure of say two pounds, and is fully open at five pounds. The advantage derived is to assist in preventing over-cooling when even the prescribed minimum of fresh air by damper 33 will over-cool. Under these conditions, as the temperature lowers to or below the desired minimum, damper 33 is also closed. If heat were available to the heater D, this damper 33 would not close, as steam would be admitted to the heater, and the usual operating pressure of the thermostat would be around five pounds, thus keeping damper 33 open for admission of air.

The operation of the method by control apparatus, as shown in Fig. 1, is as follows, assuming that an adequate supply of cold water is available at practically uniform temperatures, thereby maintaining a substantially uniform dew point in summer, and assuming also an outside dew point in summer higher than the 38° at which thermostat I is set.

First, the enclosure to be conditioned is cooled and dehumidified or heated in winter by operating the apparatus without any control until the approximate conditions desired are obtained. With the motor-operating air pressure off, the fresh air dampers are shut and the return air damper 11 open, allowing only return air to pass through the air conditioner C. Likewise, the steam supply valve 29 is open as it is direct acting. Thus, full cooling is obtained in summer, the dehumidifier being in operation with the cold water supply.

Starting in winter, spray water is not used in the air conditioner until the temperature in the enclosure is raised to normal, as its use with all return air would increase the dew point in the building. In either summer or winter operation, when the required normal minimum temperature is obtained, the air pressure supply to the thermostats is turned on and the sprays started up.

Thermostat G controls the fresh air damper 10, and a rise in temperature in summer would open this damper wider, allowing more air to be cooled to bring the temperature down to the point at which thermostat G is set, say about 71°. The air is cooled in the air conditioner to a dew point of 50° by means of the constant supply of water at practically uniform temperature. The dew point of the air in the enclosure is, of course, slightly higher, due to the evaporation of moisture from the people, but the increase is dependent on the number of people present, excluding possible infiltration of higher dew point air from outdoors. The relative humidity will be under 60 percent with a dew point of 50° and a temperature of 71°. If the temperature goes up above 71°, thermostat G causes air motor 26 to open fresh air damper 10 wider and thereby cooling more air up to the maximum opening.

If the temperature rises to the predetermined maximum, for which the thermostat H is set, then this thermostat operates, the pressure from the same lowering until relays 31 and 32 operate to prevent thermostats G and I from functioning further on air motors of the dampers 10 and 11.

Under summer operation, return air damper 11 would be thrown open taking all return air, and fresh air damper 10 would close leaving only the fixed opening at damper 33 for fresh air. Under this condition the work to be done is considerably less as the total heat from the return air is less than the total heat from the outdoor air, and the maximum refrigeration or means of cooling are used to reduce the temperature below 77° or the point at which the thermostat H was set. As soon as the temperature falls below the point for which thermostat H is set, then the relays 31 and 32 open again and thermostats G and I can function to control their respective dampers 10 and 11.

In winter the normal operation is that thermostat G, in addition to controlling fresh air dampers 10, controls diaphragm valve 29, and when the temperature is below 71° or the point at which it is set, then the pressure from the thermostat is reduced and steam is allowed to enter the heaters D, thereby heating the air. In order not to counteract the effects of each other's operation, motor 26 is set to start opening damper 10 at five pounds pressure, and diaphragm valve 29 is shut at five pounds and opens at a pressure below five pounds for steam admission. Thermostat I controls return air damper 11, and when the temperature at I is lower than 38°, or the point at which it is set, then damper 11 is opened to let in return air which will have a higher wet bulb than prevailing outdoors under winter conditions. Thermostat I can function through relay valve 32 because the maximum temperature thermostat H will have pressure on line 27 until the temperature rises to 77°.

In between summer and winter the control functions the same way, only the dew point at I may be higher than 38° due to the outside wet bulb being higher than 38°. If the wet bulb outside goes to 50° or higher, then cooling means are necessary and cold water should be sprayed in the dehumidifier. Up to this time, of course, water used for spraying is reused, the pump 17 simply recirculating the water to the sprays.

It is possible to also so arrange the balance of the air distribution through the air conditioner and its connection to the fan, so that valve 31 and pipe 30 could be removed and thereby the return air damper only would be controlled and opened under the action of the maximum temperature thermostat. This method would not reduce the total load as effectively as the method shown, as obviously more fresh air would be introduced. It is very desirable that at all times as much fresh air as possible be admitted for ventilation and consistent with practical economy of operation.

In either case, it is quite obvious that with a lack of cooling capacity, the maximum thermostat will operate to utilize the return air of lower dew point, and it is also obvious that the setting of the maximum thermostat can be arranged nearer that of the minimum thermostat so as to actually conserve capacity in the cooling means, but at the expense of fresh air ventilation.

It is also quite obvious that if sufficient cooling means were available, the thermostat H and valves 31 and 32 with pipes 30 and 30a would not be necessary.

But, as before described, it is good engineering and good practice, if not almost necessary, to allow the temperature to rise in the enclosure in order to minimize the difference in temperature between indoors and outdoors when the latter is at or near a maximum condition. It will usually be under such conditions that the peak load will be required on the cooling means, and if said cooling means be limited to a capacity required under a condition somewhat under the maximum, then this maximum thermostat control feature comes in handily to limit the rise in temperature to a predetermined maximum in the enclosure.

While, as explained, the minimum and maximum control devices G and H are preferably thermostats, the control could be effected by using hygrostats in place of these thermostats. By the control with thermostats, there is a slightly varying humidity in the enclosure, while hygrostats would give a slightly varying temperature.

As before mentioned, the air conditioning apparatus may also be located differently than as shown, and may have duct connections from the enclosure conditioned so as to return the air to the conditioning apparatus. In other words, as shown in Fig. 2, the air openings 14 and 15 could be joined in a common air duct 40 with a connection 41 from the common air duct to the return air connection to the inlet of the air conditioner, and a connection 42 to the heaters D D. If this were the case, and in order to balance the friction loss of the duct connections, it would be necessary to use a recirculating damper 43 in the duct connection to the heaters D D. This damper, which might be a partial damper, would be operated by an additional air motor 44, in turn actuated by the air pressure from pipes 25, so that when pressure was obtained in pipe 25 from thermostat G, it would close the damper in the recirculated air connection 42 to heaters D D, and thereby er, would be operated by an additional air conditioner. This recirculating damper 43 would open when the pressure in the pipe 25 was lowered. The damper is essential to the control as a balancing of the air system, as it is quite necessary that the fan static pressure be maintained as constant as possible, and whenever the fresh air damper closes under control, the recirculating damper should be opened to allow more volume of recirculated air. Partial dampers could be used to advantage for the damper 43, as shown in Fig. 2, just for balancing the fan volume and static. Of course, a bypass damper around the heater D would effect the same purpose and might be more practical and cheaper to install. It would be operated in the same manner.

If bunker coils were used in the air washer as the cooling means, the dew point leaving the dehumidifier would vary according to the work done, and the refrigerating means used would have to be regulated to maintain the required dew point.

The operation of the described control would be similar with the use of bunker coils, and if a lower dew point than necessary were maintained by the expansion coils, thereby causing the temperature to reach the minimum desired, or even go lower, the admission of steam to the heater would be necessary and would be effected by the minimum thermostat in order to prevent overcooling.

I claim as my invention:

1. In a system for controlling atmospheric conditions in an enclosure and in which air withdrawn from the enclosure is recirculated and returned to the enclosure, an air conditioner for conditioning air for delivery with said recirculated air to the enclosure, said air conditioner having provision for admitting thereto for conditioning either or both air withdrawn from the enclosure and outside air, and means operating automatically and in relation to the atmospheric conditions in the enclosure for selectively varying the volume of the said withdrawn and outside air which is admitted to the conditioner and is conditioned and delivered with said recirculating air to the enclosure.

2. In a system for controlling atmospheric conditions in an enclosure and in which air withdrawn from the enclosure is recirculated and returned to the enclosure, an air conditioner for conditioning air to provide air for mixture and delivery with said recirculated air to the closure, said air conditioner having provision for admitting thereto for conditioning either or both air withdrawn from the enclosure and outside air, and means controlled by the atmospheric conditions in the enclosure for independently varying the volume of the withdrawn air and of the outside air which is admitted to the conditioner and is conditioned and delivered with said recirculating air to the enclosure so that the mixed air delivered to the enclosure will have a temperature and moisture content adapted to maintain the desired atmospheric conditions in the enclosure.

3. In a system for controlling atmospheric conditions in an enclosure and in which air withdrawn from the enclosure is recirculated and returned to the enclosure, an air conditioner having provision for the admission thereto of air withdrawn from the enclosure and outside air and for conditioning air admitted thereto so as to provide air having a predetermined dew point, means for delivering said conditioned air with said recirculated air to the enclosure, and means controlled by the temperature of the enclosure for varying the volume of the outside air independently of the withdrawn air which is conditioned and delivered with said recirculated air to the enclosure.

4. In a system for controlling atmospheric conditions in an enclosure and in which air withdrawn from the enclosure is recirculated and returned to the enclosure, an air conditioner having provision for conditioning fresh air and providing air having a predetermined dew point, means for delivering said conditioned air with said recirculated air to the enclosure, means controlled by the temperature of the enclosure for varying the volume of the fresh air which is conditioned and delivered with said recirculating air to the enclosure, and means controlled by the dew point temperature of the air leaving the air conditioner for returning air from the enclosure to the air conditioner for conditioning when said dew point reaches a predetermined minimum point.

5. In a system for controlling atmospheric conditions in an enclosure and in which air withdrawn from the enclosure is recirculated and returned to the enclosure, means for conditioning air for delivery with said recirculated air to the enclosure, means controlled by the atmospheric condition in the enclosure for varying the volume of the air which is conditioned and delivered with said recirculated air to the enclosure, and means which operates automatically to alter the action of said first mentioned control means when the temperature of the enclosure reaches a predetermined maximum.

6. In a system for controlling atmospheric conditions in an enclosure and in which air withdrawn from the enclosure is recirculated and returned to the enclosure, an air conditioner having provision for conditioning fresh air to provide air having a predetermined dew point, means for delivering said conditioned air with said recirculated air to the enclosure, means controlled by the temperature of the enclosure for varying the volume of the fresh air which is conditioned and delivered with said recirculating air to the enclosure, means controlled by the dew point temperature of the air leaving the air conditioner for returning air from the enclosure to the air conditioner when said dew point reaches a predetermined minimum point, and means which operates automatically to alter the action of said other mentioned control means when the temperature of the enclosure reaches a predetermined maximum.

7. In a system for controlling atmospheric conditions in an enclosure, the combination of an air conditioner having an inlet for fresh air, means for delivering the conditioned air from the air conditioner to the enclosure, means for maintaining a substantially constant dew point of the air leaving the air conditioner, means controlled by atmospheric conditions in the enclosure for regulating the quantity of fresh air which is conditioned in the air conditioner, and a maximum control device which operates at a predetermined maximum condition in the enclosure to return air from the enclosure to the air conditioner.

8. In a system for controlling atmospheric conditions in an enclosure, the combination of an air conditioner having an inlet for fresh air, means for delivering the conditioned air from the air conditioner to the enclosure, means for maintaining a substantially constant dew point of the air leaving the air conditioner, means responsive to temperature changes in the enclosure which increases the quantity of conditioned fresh air delivered to the enclosure as the temperature of the enclosure increases, and a maximum control device which operates at a predetermined maximum condition in the enclosure to return air from the enclosure to the air conditioner.

9. In a system for controlling atmospheric conditions in an enclosure, the combination of an air conditioner having provision for conditioning air as to its humidity, means for delivering the conditioned air from the air conditioner to the enclosure, means for maintaining a substantially constant dew point of the air leaving the air conditioner, means controlled by atmospheric conditions in the enclosure for regulating the quantity of air which is conditioned in the air conditioner, and a maximum control device which operates at a predetermined maximum condition in the enclosure to return air from the enclosure to the air conditioner.

10. In a system for controlling the temperature and relative humidity in an enclosure, the combination of an air conditioner having an inlet for fresh air, means for delivering the conditioned air from the air conditioner to the enclosure, means for maintaining a substantially constant dew point of the air leaving the air conditioner, thermostatic means responsive to temperature changes in the enclosure for regulating the quantity of fresh air which is conditioned in the air conditioner, and a maximum temperature thermostat and means controlled thereby which operate at a predetermined maximum temperature in the enclosure to return air from the enclosure to the air conditioner.

11. In a system for controlling atmospheric conditions in an enclosure, the combination of an air conditioner having an inlet for fresh air, means for delivering the conditioned air from the air conditioner to the enclosure, means responsive to temperature changes in the enclosure for regulating the volume of fresh air conditioned in the air conditioner, and means responsive to the dew point temperature of the air leaving the air conditioner which operates at a predetermined dew point temperature to return air from the enclosure for conditioning in the air conditioner irrespective of the fresh air control.

12. In a system for controlling atmospheric conditions in an enclosure, the combination of an air conditioner having an inlet for fresh air, means for delivering the conditioned air from the air conditioner to the enclosure, means for maintaining a substantially constant dew point of the air leaving the air conditioner, means controlled by atmospheric conditions in the enclosure for regulating the quantity of fresh air which is conditioned in the air conditioner, and a maximum temperature control device which operates at a predetermined maximum condition in the enclosure to return air from the enclosure to the air conditioner and reduce the volume of fresh air passing through the air conditioner.

13. In a system for controlling atmospheric conditions in an enclosure, the combination of an air conditioner having an inlet for fresh air, means for delivering the conditioned air from the air conditioner to the enclosure, means for maintaining a substantially constant dew point of the air leaving the air conditioner, means controlled by atmospheric conditions in the enclosure for regulating the quantity of fresh air which is conditioned in the air conditioner, means for the return of air from the enclosure to the air conditioner, means responsive to the dew point temperature of the conditioned air for shutting off the return air to the air conditioner, and a maximum temperature control device which operates at a predetermined maximum temperature of the room to return air from the enclosure to the air conditioner.

14. In a system for controlling atmospheric conditions in an enclosure and in which air withdrawn from the enclosure is recirculated and returned to the enclosure, an air conditioner for conditioning air for delivery with said recirculated air to the enclosure, said air conditioner having provision for admitting thereto for conditioning either or both air withdrawn from the enclosure and outside air, means controlled by the atmospheric condition in the enclosure for adjusting the air admission means of the air conditioner to vary the volume of the air which is conditioned and delivered with said recirculating air to the enclosure, and means operating independently of said control means for passing a minimum quantity of fresh air through the air conditioner.

15. The combination with an air conditioner having provision for altering humidity and having means for admission of fresh air and of return air from an enclosure to be conditioned, and means for supplying conditioned air from said air conditioner to said enclosure, of a minimum control means responsive to temperature changes in the enclosure for regulating the volume of fresh air passing through the air conditioner, control means responsive to temperature changes in the air leaving the air conditioner for controlling the admission of return air to the air conditioner, and a maximum temperature control means responsive to temperature changes in the enclosure which operate at a predetermined maximum temperature to alter the action of said other two control means.

16. The combination with a dehumidifying device having provision for dehumidifying air and having means for the admission of fresh air and of return air from an enclosure to be conditioned, an air heating device, and means for supplying air from said heating and dehumidifying devices to said enclosure of means responsive to temperature changes in the enclosure for regulating the quantity of fresh air passing through the dehumidifying device and also for regulating said air heating means, means responsive to temperature changes in the air leaving the dehumidifying device for controlling the admission of return air to the dehumidifying device, and a maximum temperature regulating means responsive to temperature changes in the enclosure which operate at a predetermined maximum temperature to alter the action of said other two regulating means.

17. The combination with a dehumidifier having provision for dehumidifying air and having means for admission of fresh air and of return air from an enclosure to be conditioned, and means for supplying air from said dehumidifier to said enclosure, of means for controlling the temperature and relative humidity in said enclosure comprising a minimum temperature control means responsive to temperature changes in said enclosure for regulating the quantity of fresh air passing through the dehumidifier, a control means responsive to temperature changes in the air leaving the dehumidifier for controlling the return of air from the enclosure to the dehumidifier, and a maximum temperature control means which operate at a predetermined maximum temperature in the enclosure to shut off the admission of fresh air to the air conditioner and admit return air from the enclosure to the dehumidifier.

18. The combination with an air washer having provision for the supply of cold fluid for washing air and having means for admission of fresh air and of return air from an enclosure to be conditioned, air heating means, and means for supplying air from said air washer and heating means to said enclosure, of means for controlling the temperature and relative humidity in said enclosure comprising a minimum temperature control means responsive to temperature changes in the enclosure for regulating the admission of fresh air to the air washer and for regulating said air heating means, a control means responsive to temperature changes in the air leaving the air washer for controlling the admission of return air to the air washer, and a maximum temperature control means responsive to temperature changes in the enclosure which operate at a predetermined maximum temperature to alter the action of said other two control means.

19. The combination with an air conditioner having provision for altering humidity and having means for admission of fresh air and of return air from an enclosure to be conditioned, and means for supplying conditioned air from said air conditioner to said enclosure, of a minimum control means responsive to temperature changes in the enclosure for varying the quantity of air passing through the air conditioner to the enclosure, a maximum temperature control means responsive to temperature changes in the enclosure and which operate at a predetermined maximum temperature to alter the action of said other control means and admit return air from the enclosure to the air conditioner, and means unaffected by said control means for supplying a substantially fixed minimum amount of fresh air for conditioning.

20. The combination with an air conditioner having provision for altering humidity and having means for admission of fresh air and of return air from an enclosure to be conditioned, and means for supplying conditioned air from said air conditioner to said enclosure, of temperature control means responsive to temperature changes in the enclosure for varying the quantity of air passing through the air conditioner to the enclosure, a maximum temperature control means which operate at a predetermined maximum temperature to alter the action of the said other control means, means unaffected by said control means for supplying a substantially fixed minimum amount of fresh air for conditioning, and means for automatically shutting off said minimum supply of fresh air when the control by said control means is arrested.

21. The method of controlling the temperature and relative humidity in an enclosure consisting in withdrawing air from the enclosure, recirculating and returning said withdrawn air to the enclosure, conditioning air which may be either or both air withdrawn from the enclosure and other air to provide air having a predetermined dew point, delivering said conditioned air with said recirculated air to the enclosure, and varying the quantity of the air which is conditioned and delivered with the recirculated air to the enclosure so as to supply to the enclosure air having a temperature and moisture content such as to maintain the desired atmospheric conditions in the enclosure.

22. The method of controlling the temperature and relative humidity in an enclosure consisting in withdrawing air from the enclosure, recirculating and returning said withdrawn air to the enclosure, dehumidifying air for delivery with said recirculated air to the enclosure, said air which is dehumidified being either or both air withdrawn from the enclosure and outside air, and varying the quantity of the air which is dehumidified and delivered to the enclosure under the control of the temperature in the enclosure and independently of the quantity of the recirculated air delivered to the enclosure so that the air supplied to the enclosure will have a dew point such as to maintain the desired atmospheric conditions in the enclosure.

23. The method of controlling the temperature and relative humidity in an enclosure consisting in withdrawing air from the enclosure, recirculating and returning said air to the enclosure, conditioning other air to provide air having a predetermined dew point, delivering said conditioned air with said recirculated air to the enclosure, varying the quantity of the air which is conditioned and delivered to the enclosure under control of the atmospheric conditions in the enclosure, and when the temperature in the enclosure reaches a predetermined maximum, conditioning and delivering to the enclosure under control of the enclosure conditions return air from the enclosure.

24. The method of controlling the temperature and relative humidity in an enclosure, consisting in withdrawing air from the enclosure, recirculating and returning said air to the enclosure, dehumidifying other air and delivering the same with said recirculated air to the enclosure, varying the quantity of said other air which is dehumidified and delivered to the enclosure under the control of the temperature in the enclosure, and when said dehumidified air reaches a predetermined minimum dew point, conditioning and delivering to the enclosure air returned from the enclosure.

25. A system for controlling atmospheric conditions in an enclosure, comprising means by which air is withdrawn from the enclosure is recirculated and returned to the enclosure, an air conditioner for conditioning air for delivery with said recirculated air to the enclosure, said air conditioner having provision for admitting thereto for conditioning either or both air withdrawn from the enclosure and outside air, and automatic control means which operate automatically to separately and independently vary the volume of the withdrawn air and the outside air which is admitted to the conditioner and is conditioned and delivered with said recirculated air to the enclosure so as to maintain within the enclosure atmospheric conditions predetermined by the setting of said automatic control means.

26. In a system for controlling atmospheric conditions in an enclosure, comprising an air conditioner for providing air conditioned as to its moisture content, means for withdrawing air from the enclosure, bypassing it around said air conditioner, mixing it with conditioned air coming from the air conditioner and delivering the mixed air to the enclosure, means which normally operate automatically under control of the atmospheric conditions in the enclosure to regulate the admission of outside air to the air conditioner for conditioning and mixing with said bypassed withdrawn air, and means which operate automatically when the wet bulb temperature of the outside air entering the air conditioner reaches a predetermined minimum to admit to the air conditioner air withdrawn from the enclosure for raising the dew point of the conditioned air.

27. In a system for controlling atmospheric conditions in an enclosure, comprising an air dehumidifier, means for withdrawing air from the enclosure, bypassing it around said dehumidifier, mixing it with dehumidified air coming from the dehumidifier and delivering the mixed air to the enclosure, means which normally operate automatically under control of the atmospheric conditions in the enclosure to regulate the admission of outside air to the dehumidifier for dehumidification and mixture with said bypassed withdrawn air, and means controlled by the temperature of the dehumidified air which operate automatically when the wet bulb temperature of the outside air entering the dehumidifier reaches a predetermined minimum to supply heat for raising the dew point of the dehumidified air leaving the dehumidifier.

28. The method of controlling the atmospheric conditions in an enclosure, consisting in withdrawing air from the enclosure, conditioning outside air to provide conditioned air having a required humidity, mixing air withdrawn from the enclosure and in the condition in which it comes from the enclosure with said conditioned air and delivering the mixed air to the enclosure, normally regulating under control of the atmospheric conditions in the enclosure the quantity of the outside air which is conditioned and mixed with said withdrawn air to maintain a desired condition in the enclosure, and when said conditioned air reaches a predetermined minimum dew point, conditioning air withdrawn from the enclosure and mixing it after such conditioning with the other air for delivery to the enclosure.

29. In a system for controlling atmospheric conditions in an enclosure and in which air withdrawn from the enclosure is adapted to be returned to the enclosure, an air conditioner having provisions for conditioning air for delivery with said withdrawn air to the enclosure, said air conditioner having provision for admitting thereto for conditioning air withdrawn from the enclosure and also other air, means controlled by conditions in the enclosure for varying the volume of said other air which is conditioned and delivered to the enclosure, and means operating automatically when a predetermined condition is reached to reduce the volume of said other air admitted to the conditioner and to admit to the conditioner for conditioning air withdrawn from the enclosure.

30. In a system for controlling atmospheric conditions in an enclosure and in which air withdrawn from the enclosure is adapted to be returned to the enclosure, an air conditioner having provision for conditioning air for delivery with said withdrawn air to the enclosure, said air conditioner having provision for admitting thereto for conditioning air withdrawn from the enclosure and also other air, means operating under control of the temperature in the enclosure for varying the volume of said other air which is conditioned and delivered to the enclosure, and means which operate automatically before a predetermined maximum temperature in the enclosure is reached to reduce the volume of said other air admitted to the conditioner and to admit to the conditioner for conditioning air withdrawn from the enclosure.

ALFRED C. BUENSOD.